3,415,910
CALCINED GYPSUM AND A METHOD FOR
ITS PREPARATION
William A. Kinkade, Lisle, and Robert E. McCleary, Geneva, Ill., assignors to United States Gypsum Company, Chicago, Ill., a corporation of Delaware
No Drawing. Filed Jan. 11, 1967, Ser. No. 608,483
16 Claims. (Cl. 263—53)

ABSTRACT OF THE DISCLOSURE

A process for producing a calcined gypsum which comprises treating a mass of hot calcined gypsum by adding thereto, with agitation, liquid water in an amount sufficient to reduce a portion of the mass to a temperature below the boiling point of water and thereafter supplying heat to the temperature reduced portion to raise the temperature thereof to above about 215° F. The process also contemplates calcination of gypsum rock followed by the aforesaid treatment. The invention also includes a novel stabilized calcined gypsum which may be further characterized as having a stacking order index above 8 and a density above 2.60 grams per milliliter at 25° C.

This invention relates to an improved calcined gypsum whose properties in general and especially set time, pouring consistency, potential for strength development and other properties, are resistant to change upon aging. More specifically it relates to a novel, low consistency calcined gypsum (or stucco) which can be used to produce high density, high strength casts and to a method for its preparation.

The art has long recognized that kettle stucco upon aging changed its properties, most notably its normal consistency or water demand and sand carrying capacity. Because this aging was known to result in a product of lower consistency which in use produced stronger casts, attempts were made to produce artificially aged material. One such attempt is described in McAnally U.S. Patent No. 1,713,879 (May 21, 1929) in which either "single boil" or "double boil" calcined gypsum was aged by placing one ton of stucco in a plaster mixing machine and adding water over a 5 to 6 minute period. The artificial aging process is said to be completed immediately.

The stucco so treated set and hardened more quickly and showed a reduction in consistency to 60 ml. from 100 ml. Consistency of gypsum plaster is a term well understood by those skilled in the art and is determinable according to ASTM Procedure C472, or its substantial equivalent.

The article, McAnally, Gypsum and Gypsum Products Manufacture (Rock Products 33, 1931), discusses aging in general and the process of the above mentioned patent in particular, but in some respects the article is not consistent with the teachings of the patent. Especially pertinent are the following passages:

"Aged plaster of paris usually contains a percentage of water slightly in excess of that in the hemihydrate. Assuming that the theoretical quantity in the latter is 5.70% and that the aged plaster contains 6.0%, any attempt to duplicate the aged product, by controlling the calcination so that the calcined material will contain 6.0% water, is unsuccessful.

\* \* \* \* \*

". . . The quantity of water or moisture required to age plaster is less than 1% and strange as it may seem, the rapid addition of a great excess of moisture (2% to 4%) does not achieve the desired aging effect."

Marsh (U.S. Patent 2,177,668, Oct. 31, 1939) taught that proper aging could be accomplished by "quenching the thirst of the plaster." He exposed calcined gypsum (combined moisture content about 2%, showing the presence of much active anhydrate) to a humidified gas, e.g. air at 60% R.H., until sufficient moisture had been supplied to the overcalcined gypsum to rehydrate it to the hemihydrate. The examples show treating temperatures from 54° F. to 165° F. with preferred treatment at 100 to 110° F. and a combined moisture in the final product of up to 6.22%.

An alternate method of producing aged or low consistency kettle stucco is the "aridizing process" disclosed by Brookby (U.S. Patent 1,371,581, issued Mar. 8, 1921) in which a deliquescent substance such as a chloride of an alkaline earth metal was introduced into the stucco during calcination.

In a study of the properties of gypsum dehydrated "in air," Gregg and Willing, J. Chem. Soc., pp. 2916–20, 1951, reported that exposure to water vapor at 25° C. caused irreversible loss of surface area, as measured by carbon tetrachloride adsorption. They suggest that during the water adsorption some dihydrate forms at crystalline boundaries which could cement neighboring crystallites together in such a way as to seal off portions of the surface of the crystallites so that carbon tetrachloride molecules could no longer reach them.

Smith (Aging of Calcium Sulfate Hemihydrate, Nature, 198, 1055–56, June 1953) not only reported that aging reduced the surface energy of a hemihydrate sample but also described the phenomenon that is now denominated as "dispersion":

"An unusual physical reaction has been identified, occurring between calcium sulfate hemihydrate (plaster of paris) and water. The energies of hemihydrate specimens are known to depend on their method of preparation, and I have found that when high-energy specimens are mixed with cold water their particles disintegrate at once into a finely-divided state.

"High-energy hemihydrates are prepared by dissociation of the dihydrate in the absence of liquid water, and include most forms of plaster of paris supplied to the building industry. It is well known that when such plasters are mixed to a slurry with water, the rheological properties of the slurry are remarkably independent of the particle size distribution in the original dry state. This independence has not hitherto received a valid explanation, but is now clearly attributable to the disintegration phenomenon.

"Exposure of a high-energy hemihydrate to moist air causes it to 'age.' The rheological properties of its aqueous slurry are then dependent on the particle size distribution in the dry state, whereas before aging they were independent. Aged plasters I find do not disintegrate, and aging of hemihydrate is therefore the loss of that property of spontaneous disintegration in water possessed before exposure to moist air. Although aging is brought about by the reversible sorption of water, the disintegration property is lost irreversibly."

Glasson, J. Appl. Chem., 15, 4–39, 1965, related the loss in surface area with aging and determined that exposure of hemihydrate and anhydrite to water vapor caused it to age before forming gypsum whereas exposure to liquid water did not age the hemihydrate but had the effect of forming gypsum which subsequently aged.

Autoclave calcination (U.S. Patent 1,901,051 issued Mar. 14, 1933) introduced a complicating factor into the study of calcium sulfate hemihydrate. The product, called alpha hemihydrate by the inventors, was characterized by a short stubby crystal, low pouring consistencies, and absence of dispersion or disintegration upon wetting with water.

The product also has a more dense crystal and sets with a greater expansion than the beta hemihydrate (that variety of hemihydrate produced by kettle calcination.)

There are readily measurable differences in physical properties of the alpha and beta hemihydrates. A conclusion regarding the possibility of transforming one type into the other, however, depends largely upon the method of analysis employed. Evidence appears to be accumulating that change of the beta form into the alpha is not as readily accomplished as once was thought possible and probably does not take place spontaneously to any significant extent.

There is some disagreement as to the conditions under which alpha gypsum may be prepared. Based on heats of hydration and solution, Kelly and Southard (U.S. Bureau of Mines Technical Paper No. 625, 1941, at page 60) conclude that kettle plaster comprises 75% alpha hemihydrate and 25% beta hemihydrate.

From his consideration of this work, Riddell (Rock Products, 53, p. 68, 1950) concluded that:

". . . Alpha hemihydrate is the more stable form and heat of hydration measurements indicate that beta hemihydrate gradually changes to alpha hemihydrate when aged under humid conditions. This would account for the change taking place in the workability of plaster on storage." (P. 69.)

It is thus apparent that the physical and chemical changes occurring in the dehydration of calcium sulphate dihydrate are not completely understood, and their is considerable disagreement as to what actually happens in this superficially simple process.

The foregoing differences in opinions have arisen in part because an accurate quantitative determination of alpha hemihydrate has been very difficult to make. However, excellent approximations are now possible by X-ray techniques (Morris, X-ray Diffraction Identification of Alpha and Beta Forms of Calcium Sulfate Hemihydrate, Nature 198, pp. 1298–1299, 1963). The value determined is called "stacking order index" and ranges from 3.8 for predominantly beta type material produced at atmospheric pressure to 18.3 for hemihydrate with a high alpha type content produced in an autoclave. Stacking order index determination on a product produced by the aridizing process of Brookby indicated that he may have produced hemihydrate at atmospheric pressure having a substantial alpha content.

As reported by Smith (Nature, supra) the tendensy of stucco particles to disperse or disintegrate appears to be inherent in material which has been produced at atmospheric pressure. This tendency is most noticeable in fresh product and gradually diminishes as the stucco ages. A change in properties of the stucco with time is commercially undesirable and a more stable product has long been sought.

In making plaster casts, a higher density cast ordinarily will exhibit greater compressive strength. A limit is placed on the density of the cast, however, by the quantity of water required to prepare a castable slurry so that a low consistency stucco, usually of the alpha type requiring but little water to form a slurry, ordinarily is needed to make high strength casts.

It is an object of this invention to provide a calcium sulfate hemihydrate which will produce low consistency slurries settable to high density, high strength casts, and a process for its preparation.

A further object of this invention is to provide a calcium sulfate hemihydrate which has improved stability on aging, particularly with respect to setting time, consistency and dispersibility.

Another object of this invention is to provide a process for the preparation of the foregoing product with or without the use of chemical additives, crystal habit modifiers and the like.

It is an object of this invention to produce a calcium sulfate hemihydrate product which is highly resistant to disintegration (dispersion) when wetted with water.

It is still a further object of the invention to provide a product which is resistant to disintegration when wetted with water and subjected to mechanical agitation in an aqueous slurry.

A still further object of the invention is the provision of a relatively dry process for the production of calcium sulfate hemihydrate having a normal pouring consistency of less than about 60.

A still further object is the production, at atmospheric pressure without salt additives and by a "dry" process, of a stucco having a stacking order index considerably higher than that obtainable by prior art kettle calcination.

Other objects and advantages of this invention will appear from the following detailed description and examples.

Those skilled in the art recognize that atmospheric calcination of gypsum may be conducted according to a number of procedures and consequently the stucco to be produced according to the method of this invention will vary somewhat depending upon the type of rock available and local practices for calcining such rock.

The objects of this invention are obtained in general by the treatment of a dispersible stucco with water under conditions of time and temperature which severely restrict the formation of the dihydrate followed by a reduction of the water content of the in-process material.

Accordingly in one broad form the present invention is a process of treating a mass of hot calcined gypsum which comprises adding thereto with agitation liquid water in quantity sufficient to reduce the temperature of a substantial portion of said mass to below the boiling point of water, and supplying heat to the temperature-reduced portions to raise their temperature to above 215° F.

The product of this atmospheric pressure treatment is extremely resistant to dispersion or disintegration when aqueous slurries are formed, and this resistance persists in the presence of mechanical agitation. Furthermore, the product produces a response to analytical procedures similar to that obtained with blends of alpha and beta varieties of hemihydrate.

The higher dispersion resistance of the treated product suggests that recrystallized material has been deposited in the fissures and flaws in the calcined crystals and secures the crystallites against disintegration when agitated in a water slurry.

The process of this invention may be practiced on previously produced dispersible stuccos, but in one embodiment it includes the preparation of the stucco in a kettle. The kettle calcination desirably should be continued until the temperature of the calcining mass is more than about 250° F., preferably above about 285° F., and most preferably it should be in the range of about 300 to 310° F., at which temperature the combined moisture of the contents usually is slightly less than a theoretical value which can be calculated for the hemihydrate based on the purity of the rock being calcined. Satisfactory results were achieved when even higher temperatures were reached and calcination was carried into the "second boil" or active anhydrite stage. Stucco which reached a temperature from 380° F. to about 500° F. has been successfully treated according to this invention. In any event, at this point in the calcination, liquid water at about room temperature is added rapidly to the calcined mass.

The amount of water added is desirably more than enough to convert any active anhydrite to the hemihydrate. The temperature reached during the water addition or quench step depends to a certain extent upon the amount of water added and the amount of heat stored in the refractory surrounding the calcining kettle, but a temperature between about 155° F. and about the boiling point of water is satisfactory, and from about 180° F. to about 200° F. is preferred. Temperatures referred to in this step are average temperatures of the entire mass, and it should be understood that during the quench step local temperatures either above or below the "average" temperature are present. If a lumping can be avoided and agitation maintained, the kettle temperature during the quench may be permitted to go considerably lower. Successful laboratory treatments have been accomplished at room temperature.

In a preferred embodiment of this invention the water addition or quench step is carried out on the calcined gypsum mass which is maintained relatively free of lumps and in a fluid or flowable condition by supplemental gas agitation used to augment mechanical agitation. More specifically gas (such as air) agitation and fluidization is carried out in conjunction with mechanical agitation during the quench or water addition step, and during the reheat step described in the following:

Next, a drying or reheat step is provided to reduce the moisture content of the stucco to near the theoretical hemihydrate value. Batches which have been reheated to 215° F. to 225° F. achieved low consistencies and satisfactory set times but did not flow as readily or handle as well in subsequent processing operations as those which had been heated to a somewhat higher temperature, for example about 240° F. Some advantage is seen in reheating the product to a still higher temperature, a final temperature of over 315° F. has been reached without impairing the desirable characteristics of the product. Production of substantial quantities of active anhydrite should be avoided.

While applicants do not want to be bound as to a theory of operation of this invention, it may be that the desirable results are achieved in part because the formation of an alpha hemihydrate-like material probably in the fissures of the basically beta particles, reduces the tendency of the particles to disintegrate upon wetting with water.

The following examples will help illustrate the operation of the process of this invention and the novel product produced. It is to be understood that the examples are illustrative only and not limiting.

Example 1

A commercial kettle was charged with 15 tons of gypsum rock having a low chloride content, ground so that 90 to 95 percent was minus 100 mesh. Analysis disclosed no free moisture and a combined water content of 20.50%. Procedures for these determinations are set forth in ASTM C471. The kettle was fitted with a temperature indicating instrument using a bare thermocouple as a sensor and a recording thermometer which had its sensing bulb in a protective well. Because of its more rapid response, the thermocouple was considered better adapted to indicate the temperature within the kettle when the temperature was changed quickly during the process of this invention. Bulb temperatures are in parentheses. The calcination was performed in the usual manner until the calcining mass reached a temperature of 311° F. (285° F.), when the fire was cut off. The temperature continued to rise to 347° F. at which time the combined moisture content was 5.78% and a sample designated "regular stucco" in Table I was taken as representative of production as usually practiced according to the prior art.

Approximately 3100 pounds of water were then added in about 25 minutes which reduced the measured temperature of the kettle contents to 200° F. (220° F.).

As the water was added, the kettle contents became very heavy and damp in appearance with a crumbly texture. Care in water addition was necessary to avoid lumping and to prevent excessive power consumption on the mechanical agitator. To avoid the potential problem at this stage of the process, the kettle had been modified so that supplemental agitation could be obtained by gas injection. The modification comprised four ½ inch pipes parallel to and adjacent the kettle walls. The pipes were sealed at their lower ends and had a 3/16 inch hole drilled about 8 inches above the bottom of the kettle and directed toward the agitator shaft. Just before the water addition was begun, air at 48 p.s.i. was supplied to the pipes and the flow continued for the balance of the process.

At the end of the water quench step a number of samples of the kettle contents were taken. One portion was analyzed immediately and found to contain 8.6% total water. A second portion was drowned in acetone, filtered and dried and found to contain 7.7% water.

Further analyses on other acetone dried samples were made and appear in Table I under the heading of Quenched Stucco.

Five minutes after the end of the water addition the kettle fire was turned back on until the contents reached 291° F. (255° F.), when the kettle was dumped to the hot pit. Samples of this material were taken and analyzed and appear in Table I under the heading "Stabilized Stucco." About ten days after their preparation, the samples of regular stucco, quenched stucco and stabilized stucco which had been stored in sealed metal cans, were each divided into several portions and aged at 65% relative humidity and 90° F. for 1, 3, 7 and 14 days. The samples were analyzed and the results are reported in Table I.

Referring now to Table I, it is clear that the regular stucco had a rather high normal consistency of 106 ml. which declined as the product aged, until after 14 days it was only 58 ml. The set time shortened from 60 to 30 minutes, and the surface area, after water immersion (dispersed surface area), dropped to 9970 from 21,300 square centimeters per gram. These results indicated the relatively large changes in properties which characteristically occur upon aging of regular kettle stucco. When a cast was prepared from a slurry of normal consistency of the fresh material, it had a dry density of 45.5 pounds per cubic foot, and a compressive strength of 552 pounds per square inch. The stacking order index was 5 to 6 and did not change upon aging.

The quenching step reduced the consistency of the quenched stucco to a value of 56 but at the same time immediately shortened the set to 25 minutes; after aging 14 days the set was only 6 minutes. Obviously, if such quick setting material is to be sold commercially, excessive corrective formulation would be required.

The stabilized stucco was found to have a normal consistency of only 57 ml. which changed very little to 54 ml. on aging for 14 days. The setting time and dispersed surface area also did not vary excessively upon aging. When a cast was prepared at normal consistency it was found to have a density of 69.8 pounds per cubic foot and a dry compressive strength of 3149 pounds per square inch, nearly 500% greater than that shown by the cast prepared from regular stucco. The stacking order index was 9, indicating a substantial content of alpha hemihydrate (alpha hemihydrate prepared in an autoclave has a stacking order index of 13 to 18). Lower normal consistencies and resulting higher strengths have been obtained on other runs when the quench time was lengthened and the kettle contents allowed to "simmer" for about an hour before the stabilizing (reheating) step was performed.

TABLE I.—STUCCO PROPERTIES

| Days at 65% RH and 90° F | REGULAR STUCCO | | | | | QUENCHED STUCCO | | | | | STABILIZED STUCCO | | | | |
|---|---|---|---|---|---|---|---|---|---|---|---|---|---|---|---|
| | 0 | 1 | 3 | 7 | 14 | 0 | 1 | 3 | 7 | 14 | 0 | 1 | 3 | 7 | 14 |
| Normal Consistency ml | 106 | 88 | 71 | 58 | 58 | 56 | 56 | 54 | 54 | 54 | 57 | 57 | 55 | 54 | 54 |
| 300 g. Vicat Set Min | 60 | 44 | 20 | 30 | 30 | 25 | 16 | 12 | 12 | 6 | 43 | 42 | 31 | 30 | 27 |
| Dry Density lb./cu. ft | 45.5 | | | | | 68.4 | | | | | 69.8 | | | | |
| Compressive Strength, p.s.i | 552 | | | | | 2,762 | | | | | 3,149 | | | | |
| Combined H₂O | 4.78 | 6.84 | 7.23 | 7.35 | 7.34 | 7.72 | 7.49 | 7.54 | 7.69 | 7.63 | 6.12 | 6.5 | 6.94 | 7.15 | 7.18 |
| Stacking Order Index | 5–6 | | | | 5–6 | 7 | | | | 7 | 9 | | | | 9 |
| Surface Area, Blaine sq. cm/g.: | | | | | | | | | | | | | | | |
| Before H₂O immersion | 4,150 | 4,080 | 4,110 | 3,960 | 3,970 | 3,650 | 3,670 | 3,650 | 3,620 | 3,740 | 4,090 | 3,860 | 3,880 | 3,870 | 4,050 |
| After H₂O immersion | 21,300 | 22,000 | 5,670 | 11,900 | 9,970 | 6,870 | 6,790 | 6,730 | 6,460 | 5,960 | 8,730 | 7,060 | 7,030 | 6,750 | 6,020 |

The high value reported for the dispersed surface area shows that a slurry of the regular stucco would stiffen considerably as the particles disintegrate and that relatively large quantities of water would have to be added to counteract this tendency. This much lower values of dispersed surface area determined for the stabilized stucco shows that it would require far less additional water than regular stucco to offset stiffening tendencies, and the change in the amount of correction as the product aged would vary far less than the regular stucco.

The results reported in Table I show that stacking order index is a property of stucco which does not change with aging. It is quite clear therefore, that although the aged regular stucco does approach the stabilized material in some of its physical properties, it does not possess the distinct crystalline nature which distinguished the stabilized product.

Differential Thermal Analysis showed a progressive gain in adsorbed moisture with aging on all samples with a trace of dihydrate formation in the aging of quenched and stabilized stucco samples.

Additional runs were made with 15 ton charges in a calcining kettle operated under batch conditions. The processing conditions were varied slightly from those set forth in Example 1 and are summarized in Table I–A which appears below along with a summary of the characteristics of the stucco product.

Example 2-A

Five hundred grams of a non-aridized batch kettle stucco having a consistency of 80 ml. and a combined water content of 6% were mixed with one hundred grams of water while both were at room temperature. After a few minutes, and with continued agitation, the temperature of the mass was brought up to 300° F. A sample of heated material was determined to have a consistency of 58 ml. and a combined water content of 6.1%.

The process of this invention also is particularly advantageous in that it enables the manufacture of low consistency stabilized stuccos under circumstances where such manufacture would not otherwise be economically practical. One way of achieving kettle stucco with a consistency below 60 ml. is to "aridize" with a salt such as calcium chloride added to the kettle contents prior to calcination. But since it is prohibitively expensive to remove the salt after calcination it remains in the product and continues to influence the properties of the finished goods. Moreover, the "aridizing" process is not applicable to use in rotary calciners although such stuccos can be reduced in consistency by the process of this invention as illustrated in Example 3, which follows:

Example 3

A sample of rotary calciner stucco was taken after regrinding to normal fineness for use in wallboard manu-

TABLE I-A.—BATCH KETTLE CALCINATIONS, 15 TON KETTLE

| Run No | 110 | 111 | 112 | 113 | 114 | 115 | 116 |
|---|---|---|---|---|---|---|---|
| Kettle Temperatures ° F.: | | | | | | | |
| Before H₂O Addition | 295 | 290 | 380 | 315 | 293 | 310 | 310 |
| After H₂O Addition | 214 | 210 | 216 | 209 | 201 | 208 | 210 |
| Before Dump | 214 | 220 | 220 | 225 | 290 | | |
| Water Added Pounds | 1,580 | 1,360 91/T | 2,740 | 3,500 248/T | 2,660 | 3,000 | 3,000 |
| Stucco Properties: | | | | | | | |
| Before Treatment, Normal Consistency ml | | | | 75 | | 115 | 115 |
| After Treatment, Normal Consistency ml | 58 | 60 | 61 | 57 | 59 | 56 | 56 |
| Vicat Set Min | 41 | 36 | 30 | 35 | 36 | | |
| Combined H₂O Before Quench | | | | 5.56 | | 6.08 | 6.12 |
| Total H₂O After Quench | | | | | | 9.70 | 9.82 |
| Free H₂O After Quench | | | | | | 3.28 | 3.38 |
| Combined H₂O After Reheat | 6.34 | 5.9 | 5.76 | 5.72 | 5.42 | 6.06 | 6.22 |
| Theory Combined H₂O | 5.62 | 5.63 | 5.58 | 5.7 | 5.50 | | |

The process of the invention may be employed on stuccos produced according to other processes as illustrated below.

Example 2

One thousand grams of stucco produced by a continuous kettle process according to Patent No. 3,236,509 were placed in a laboratory kettle and warmed to 250° F. Hot water was then added to reduce the stucco temperature to 195° F., after which the stucco was reheated to 240° F. and dumped from the kettle. The comparison of the starting material with the stabilized product is shown in Table II. The setting time was virtually unchanged although the normal consistency had been reduced to 57 from 70 ml.

TABLE II.—CONTINUOUS KETTLE STUCCO

| | Regular | Stabilized |
|---|---|---|
| Pouring Consistency ml | 70 | 57 |
| Vicat Set Min | 25 | 23 |
| Dispersed surface area sq.cm./g | 25,400 | 12,400 |
| Combined Water (percent) | | 6.2 | facture and 1,000 grams charged into the laboratory kettle and heated to 316° F. Water was then added to reduce the temperature of the stucco to 190° F. after which it was reheated to 285° F. and dumped. The results, shown in Table III, disclose that the consistency was reduced, and at the same time the Vicat set time was improved to a normal value.

TABLE III.—ROTARY CALCINER STUCCO

| | Regular | Stabilized |
|---|---|---|
| Pouring Consistency ml | 87 | 60 |
| Vicat Set | 9 | 33 |
| Dispersed surface area sq. cm./g | 21,100 | 17,500 |
| Combined water (percent) | 7.4 | 6.0 |

Example 4

Rock was calcined in a rotary calciner to give a stucco with a normal consistency of 95. Fifty pounds of this stucco were then placed in a vertical pipe having a length of 36 inches and a diameter of 10 inches and fitted with a porous stone bottom through which fluidizing air was admitted to agitate the stucco contents. This reactor also was fitted with a 400 r.p.m. paddle type agitator and a heating jacket. The stucco was heated to 326° F. and then quenched to 196° F. by the addition of water. It was then reheated to 250° F. and dumped. The product had a normal consistency of 52.

The correlation of reheat temperature and combined water content with stucco consistency is illustrated by the following example.

Example 5

Six hundred grams of continuous kettle stucco having a consistency of 69 ml. and a temperature of 250° F. were agitated in an open reactor. One hundred grams of water at 70° F. were added and the temperature of the mass dropped to 155° F. On reheating, samples were taken at 300° F., 350° F., and 425° F. with the results as reported in Table IV. These results demonstrate that at a reheat temperature of 300° F. and a combined water content of 6% the desirable low consistency of 57 ml. was maintained. Increasing the reheat temperature to 350° F. so that combined water was reduced to 5.3% raised the consistency slightly to 59 ml. but reheating to 425° F. and until the water content was only 0.6%, so that the product was largely active anhydrite, caused the consistency to revert to a value about equal to that of the starting stucco.

TABLE IV.—EFFECT OF REHEAT ON TREATED STUCCO CONSISTENCIES

| Stucco Sample | Reheat Temp., °F. | Comb. Water, percent | Consistency, ml. |
|---|---|---|---|
| Continuous kettle | (¹) | 6.22 | 69 |
| Treated | 300 | 6.0 | 57 |
| Do | 350 | 5.3 | 59 |
| Do | 425 | 0.6 | 68 |

¹ Control.

From the foregoing examples, it will be clear that the best results are obtained when sufficient water is added to affect the properties of the entire mass of stucco being treated. However, it is possible to obtain desirable effects by a milder treatment in which case the effect will be local in nature and there will not appear to be much effect on the total mass of the material. To further illustrate this particular point, consider that the calcined stucco is at 300° F. and a small quantity of liquid water is added to the kettle. Most certainly that stucco which is in contact with the liquid water has its temperature reduced to below the boiling point of the water until sufficient heat can be transferred from the great mass of the stucco to evaporate the water which had been added. Thus at least a small portion of the stucco has received the treatment described above although this would not be detectable by instruments responsive only to a major proportion of the contents in the treating vessel.

It also has been found possible to employ the process of this invention to adjust the set time of low consistency stucco which, for some not yet understood reason, had a set time undesirably short.

The following example will illustrate the expansive properties of the product of this invention.

Example 6

A sample of stucco processed according to the procedure set forth in Example 1 and having a dry surface area of about 4,000 sq. cm. per gram was reground through an Entoleter system to yield a plaster having a surface area of about 7430 sq. cm. per gram. When tested at a consistency of 70 ml. the cast had a dry density of 69.72 lbs. per sq. ft., a dry compressive strength of 3,170 p.s.i. and exhibited a maximum expansion of about 0.230%. According to Offutt and Lambe (Plaster and Gypsum Cements for the Ceramic Industry, Bull. Amer. Ceram. Soc., 26, No. 2, 29, 1947), beta type pottery plaster at a test consistency of 70 (pounds of water per hundred pounds of plaster) showed a maximum of expansion of 0.16%, and produced a cast having a dry compressive strength of 1900 lbs. per sq. inch. Under the same conditions, a typical alpha gypsum cast at a consistency of 40 showed a maximum expansion of 0.29% and produced a cast having dry compressive strength of 5500 lbs. per sq. inch.

The following example illustrates the operation of the method of this invention on aridized stucco.

Example 7

A commercial kettle was charged with 15 tons of finely ground gypsum rock to which was added 2.4 lbs. of calcium chloride (anhydrous) per ton. The kettle contents were agitated and heated until the temperature reached 328° F. A sample taken at this point, representative of aridized stucco as normally produced, was found having a stacking order index of 5.2 and a consistency of 66 ml. Approximately 3420 lbs. of water were then added to the aridized stucco which reduced the indicated temperature of the kettle contents to 206° F., after which they were reheated to an indicated temperature of 270° F., and dumped. A sample of this material was taken from the hot pit and found to have a stacking order index of 8.0 and a consistency of 61.

The density of the product of this invention, together with Stacking Order Index, is helpful in distinguishing it from other forms of calcium sulfate hemihydrate previously known in the art.

The density determinations reported in Table V were run in 25 ml. pycnometers using dried reagent grade methanol as the immersion liquid and 2 to 3 gram samples of the hemihydrates. Methanol was selected because it had a low density, low viscosity and reasonably low vapor pressure at 25° C. at which all determinations were made.

TABLE 4.—DENSITY OF CALCIUM SULFATES

| Sample | Density (g./ml.) | S.O.I. ² |
|---|---|---|
| 1. Commercial Kettle Hemihydrate | 2.55 | 6.6 |
| 2. Commercial aridized kettle hemihydrate 1.13 to 1.46 pounds CaCl₂ per ton | 2.58 | 7.9 |
| 3. Hemihydrate 1, kettle quenched and reheated | 2.62 | 9.6 |
| 4. Bench scale, Batch kettle hemihydrate quenched and reheated | 2.66 | 8.1 |
| 5. Kelly, Southard & Anderson alpha ¹ | 2.757 | |
| 6. Kelly, Southard & Anderson beta ¹ | 2.637 | |
| 7. C.P. hemihydrate beta | 2.64 | 0 |

¹ Reported in U.S. Bureau of Mines Technical Paper No. 625, 1941, p. 8, 9.
² S.O.I., Stacking Order Index.

The density values of Table V clearly show that alpha hemihydrate (item 5) has a much higher density than the beta variety (item 6) and that commercial kettle hemihydrate manufactured with (item 2) or without (item 1) aridizing treatment is lower in density than the product of this invention (items 3 and 4). Item 7 is a C.P. (chemically pure) hemihydrate in the beta form prepared at atmospheric pressure. Mixtures of hemihydrates of different densities can be separated by sink-float and density gradient methods such as those described by P. L. Kirk, Crime Investigation, Interscience Publishers, N.Y., 1953, pp. 550–552, and O. C Smith, Identification and Qualitative Chemical Analysis of Minerals, Van Nostrand, N.Y., 1953, pp. 15–16.

Some of the foregoing physical properties can be used to characterize the hemihydrate product produced by the process of the present invention. The indicia which are useful in the characterization, after drying of the sample by the procedure of section 2(a) of ASTM Method C–471–61, are:

(a) A density above 2.60 g./ml. at 25° C.;
(b) A Stacking Order Index above 8;
(c) Less than 10% floats when placed in a non-solvent liquid having a density of 2.62 g./ml. at 25° C.;
(d) Less than 10% sinks when placed in a non-solvent liquid having a density of 2.68 g./ml. at 25° C.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:

1. A process of treating a mass of hot calcined gypsum which comprises adding thereto, with agitation, liquid water in a quantity sufficient to reduce the temperature of a portion of said mass to below the boiling point of water and supplying heat to the temperature reduced portion to raise the average temperature to above about 215° F.

2. A process according to claim 1 wherein the water is added in an amount sufficient to reduce the average temperature of the mass to between about 180° F. and the boiling point of water.

3. A process according to claim 1 wherein the water added is in an amount sufficient to reduce the average temperature of the mass to between about 180 and 200° F.

4. A process according to claim 1 wherein the water added is in an amount sufficient to establish a free moisture content of up to about 3% of the total weight of the calcined mass.

5. A process according to claim 1 wherein the reheating step is carried out until the mass of calcined gypsum contains combined moisture in an amount approximately that calculated for hemihydrate.

6. A process according to claim 1 wherein the agitation supplied to the calcined gypsum mass during the water addition step is a combination of mechanical agitation and gas fluidization.

7. A process for producing a calcined gypsum stucco which comprises charging a calcining kettle with finely divided crushed gypsum rock, heating said kettle to calcining temperatures thereby converting the gypsum rock to calcined gypsum, said calcined gypsum having a combined moisture content not substantially higher than that calculated for calcium sulfate hemihydrate, maintaining said mass of hot calcined gypsum in an agitated condition and simultaneously quenching the same by adding thereto liquid water in an amount sufficient to reduce the temperature of said mass to below about the boiling point of water, reheating the quenched calcined gypsum for a period of time to temperatures sufficient to reduce the combined moisture content of the mass to an amount approximately that calculated for the hemihydrate, and thereafter removing the calcined gypsum product from the calcining kettle.

8. The process according to claim 7 wherein the water added in the quenching step is in an amount sufficient to provide up to about 3% of the total weight of the calcined mass of gypsum rock as free water.

9. The process according to claim 7 wherein the agitation of the calcined gypsum during the quenching step is a combination of mechanical agitation, and agitation provided by a gas stream introduced under pressure into the gypsum mass.

10. The process according to claim 7 wherein the average temperature of the mass at the conclusion of the water addition step falls within the range of between about 150° F. to 200° F.

11. A process according to claim 7 wherein the mass of calcined quenched gypsum is reheated to temperatures above about 215° F.

12. The process according to claim 7 wherein the mass of calcined gypsum produced by the calcining of gypsum rock has attained a temperature of from about 250° F. to 500° F. prior to the initiation of the quenching step.

13. The process according to claim 7 wherein the quenched gypsum is reheated to temperatures above about 240° F. but below the temperatures at which substantial amounts of active anhydrite are produced.

14. A process for producing a calcined gypsum of enhanced alpha hemihydrate content as determined by stacking order index, which comprises heating crushed gypsum rock at elevated temperatures to convert the gypsum rock to the hemihydrate form, quenching the hot mass of calcined gypsum with an amount of liquid water sufficient to reduce the average temperature to below about the boiling point of water, said quenching step being accompanied by agitation of the mass, reheating the mass for a period of time to temperatures sufficient to reduce combined moisture content of the mass to an amount approximately that calculated for calcium sulfate hemihydrate.

15. A calcium sulfate hemihydrate characterized by the following, after drying in accordance with the procedure described in section 2(a) of ASTM method C–471–61:

(a) Density above 2.60 g./ml. at 25° C.,
(b) Stacking Order Index above 8,
(c) Less than 10% of which floats when wetted with a non-solvent liquid having a density of 2.62 g./ml. at 25° C., and
(d) Less than 10% of which sinks when wetted with a non-solvent liquid having a density of 2.68 g./ml. at 25° C.

16. A process for producing a calcined gypsum of reduced consistency which comprises agitating a mass of finely divided calcined gypsum of a combined moisture content about equal to the theoretical calculated for calcium sulfate hemihydrate, adding liquid water to said agitated mass in an amount sufficient to establish a free moisture content in said mass of up to about 3%, and supplying heat to raise the temperature of the wetted mass up to above the boiling point of water.

References Cited

UNITED STATES PATENTS 1,571,189   2/1926   Dressler _____ 263—53

JOHN J. CAMBY, *Acting Primary Examiner.*

UNITED STATES PATENT OFFICE
CERTIFICATE OF CORRECTION

Patent No. 3,415,910                                         December 10, 1968

William A. Kinkade et al.

It is certified that error appears in the above identified patent and that said Letters Patent are hereby corrected as shown below:

Column 2, line 9, "anhydrate" should read -- anhydrite --. Column 3, line 20, after "alpha" insert -- form --. Column 5, line 37, after "temperature," insert -- and --. Column 7, line 18, "This" should read -- The --. Column 12, line 6, "150° F." should read -- 155° F. --.

Signed and sealed this 10th day of March 1970.

(SEAL)

Attest:

Edward M. Fletcher, Jr.                         WILLIAM E. SCHUYLER, JR.

Attesting Officer                                    Commissioner of Patents